E. P. BATES.
Apparatus for Preserving Food.
No. 202,979. Patented April 30, 1878.
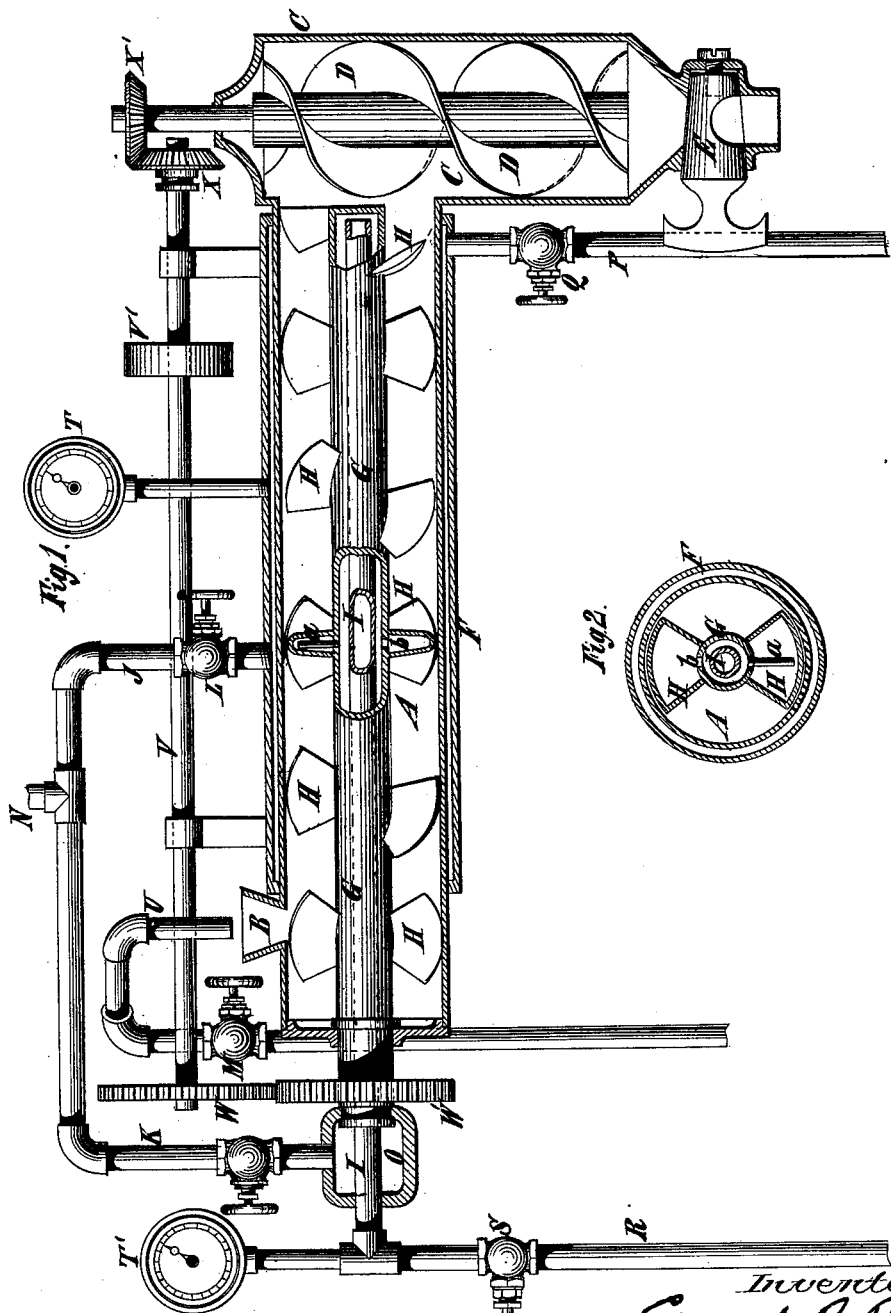
Witnesses,
Chandler Hall
Thomas E. Birch.
Inventor
Edward P. Bates
by his atty.,
Edwin H. Brown.

UNITED STATES PATENT OFFICE.

EDWARD P. BATES, OF SYRACUSE, NEW YORK, ASSIGNOR TO EDWARD W. PARMELEE, OF SAME PLACE.

IMPROVEMENT IN APPARATUS FOR PRESERVING FOOD.

Specification forming part of Letters Patent No. 202,979, dated April 30, 1878; application filed June 27, 1877.

*To all whom it may concern:*

Be it known that I, EDWARD P. BATES, of the city of Syracuse, county of Onondaga, and State of New York, have invented certain new and useful Improvements in Preserving and Cooking Vegetables, &c., of which the following is a description:

This invention relates particularly to the preservation of corn and other vegetables.

In carrying out my invention I do not admit the steam employed for heating purposes into contact with the vegetables at all; but I supply them with the requisite moisture by introducing water into the vessel wherein they are contained, thereby obviating all the contamination due to steam from an impure generator; and I circulate the steam through a jacket surrounding the vessel containing the vegetables, and preferably, also, through a hollow shaft arranged in said vessel, and through hollow feeder-blades extending obliquely from this shaft, but out of line with each other, so as not in any sense to form a spiral or worm, for, when set in this way, they do not feed the vegetables through the vessel in a continuous body or mass, but severally enter the body or mass at different parts, thereby of themselves constituting stirrers, effectually subjecting all parts of the vegetables to the heat and diffusing the heat from the steam within them throughout the body or mass of vegetables.

In the accompanying drawing, Figure 1 is a central longitudinal section of an apparatus embracing my improvements; and Fig. 2 is a transverse section of the hollow shaft and return-pipe thereof, and facial section of two of the feeder-blades.

Similar letters of reference designate corresponding parts in both figures.

A designates a vessel, shown as consisting of a horizontally-arranged cylinder, into which are introduced the vegetables or other articles to be preserved or cooked. This vessel is preferably provided near one end with a hopper, B, to facilitate the introduction into it of the vegetables or other articles, and at the opposite end with a delivery device consisting of a downwardly-extending cylinder, C, furnished internally with a feeding-screw, D, for carrying down the vegetables or other articles, and at the bottom with a spout adapted to fit within a can for containing the vegetables or other articles, and provided with a cock, E, to control their exit from it. The key of this cock may, with advantage, be cut away, as illustrated, to afford a free escape to said articles when opened.

The feeding-screw D may be driven in any suitable manner, and serves, without any manipulation, to pack the articles in delivering them into their cans or receptacles.

F designates a jacket surrounding the vessel A, and adapted to receive a heating agent, such as steam, between it and said vessel, for the purpose of imparting heat to the vessel and its contents.

G designates a hollow shaft, arranged within the vessel A, and carrying the devices by which the vegetables or other articles are stirred, mixed, and fed along the said vessel. These devices, in this example of my invention, consist of hollow blades H, adapted to receive the heating agent, arranged obliquely on the said shaft, and forming segments of worms or screw-threads. Preferably these blades or segments are arranged so that they will act on different portions of the vegetables or other articles in feeding them along. With this result in view, they may, with advantage, be so arranged that they will not together form portions of one worm or screw-thread, but will form portions of different worms or screw-threads, for, when thus arranged, they will not force the vegetables or other articles through the vessel in one unbroken column or mass, but each blade will enter the body or middle of the mass, impelled forward by the preceding blade.

By this novel process of feeding, the vegetables or other articles will be continuously stirred or mixed up, exposed at all parts to the influence of the heating agent in the jacket and hollow shaft, and, moreover, effectually subjected to the influence of the said agent by the very contact with the blades or segments whereby they are stirred, mixed, and fed along.

To promote a thorough circulation of the heating agent through these blades or segments H, I preferably provide them with pipes

*a*, communicating with the hollow shaft G, and leading to the part of the blades or segments most remote therefrom, and with return-passages *b*, leading from their innermost parts to the hollow shaft G.

I designates a pipe arranged within the hollow shaft G, and extending nearly to the inner closed end thereof. Through this pipe returns the heating agent, and in so doing passes a second time through the hollow shaft, and exerts additional influence on the contents of the vessel A.

The means for introducing the heating agent into the jacket F and hollow shaft G, and conducting it therefrom, may be of any suitable kind. The apparatus illustrated in the drawing being particularly adapted for the use of steam as an agent for heating the contents of the vessel A, I have shown ordinary steam-pipes J and K, provided with valves or cocks L and M, and leading from a main steam-pipe, N, for introducing the steam to the jacket F and hollow shaft G, the pipe K leading into a stationary chamber, O, leading to said hollow shaft. The means shown for conducting the steam and any water of condensation from the jacket and hollow shaft consist in a pipe, P, leading from the jacket, and provided with a valve or cock, Q, and a pipe, R, leading from the return-pipe I, and provided with a valve or cock, S. Gages T and T', respectively connected with the jacket F and the pipe R, serve to indicate the pressure in the jacket and the hollow shaft.

U designates a pipe leading to the hopper B, and provided with a cock or valve for supplying the vessel A with pure water, to impart to the vegetables or other articles the moisture required in preserving and cooking them.

The shaft G and the feeding-screw D of the delivery device E may be driven in any suitable manner. I have shown a shaft, V, provided with a belt-pulley, V', transmitting power through the gear-wheels W W' to the hollow shaft G, and through the bevel-gear wheels X X' to the feeder-screw D.

The corn, removed from the cob, or the other vegetables to be preserved, is introduced through the hopper B, together with a quantity of water, preferably heated, into the vessel A. It is then fed along, and meanwhile stirred up and cooked by heat radiated from the jacket F, hollow shaft G, and blades or segments H, and, passing into the delivery-cylinder C, it is packed by the feeding-screw D, and delivered, under control of the cock E, into cans or other receptacles for preservation and shipment.

It will be observed that the steam does not come into direct contact with the corn or other vegetables, and that the moisture is supplied independently of the steam in the form of water introduced with the vegetables through the hopper B. The advantages of this process of applying the heat and moisture are that the quantity of moisture and the degree of heat may be regulated conveniently, and the moisture introduced may be insured being pure.

This apparatus is also applicable, at least in part, to the drying or cooling of various kinds of articles.

What I claim as my invention, and desire to secure by Letters Patent, is—

1. The combination, with a jacketed vessel for cooking, drying, or cooling, of a hollow rotary shaft and hollow segmental feeder-blades set spirally thereon, though out of line with each other, said blades serving as stirrers, feeders, and heaters.

2. The combination, with a jacketed vessel for cooking, drying, or cooling, of a hollow rotary shaft and hollow segmental feeder and stirrer blades, having an inlet-pipe extending from the shaft to near the stirring-edge of the blade, surrounded by a return-pipe, for the purpose of thoroughly diffusing the heating or cooling agent in said blades.

3. The combination of a jacketed vessel for cooking, drying, or cooling, of a hollow rotary shaft, bearing upon its surface hollow segmental stirrer and feeder blades, with an outlet pipe extending nearly the entire length thereof, and commencing near the opposite end of the shaft to that from which it emerges.

4. The combination of the vessel A, jacket F, hollow rotary shaft G, return-pipe I therein, hollow feeding and stirring blades H, pipes K J N, delivery-cylinder C, and spiral feeder D, substantially as and for the purpose set forth.

EDWARD P. BATES.

Witnesses:
 W. H. GIFFORD,
 E. C. WRIGHT.